H. FOERSTERLING, H. PHILIPP, & R. N. SARGENT.
PROCESS OF MANUFACTURING CYANOGEN COMPOUNDS.
APPLICATION FILED OCT. 29, 1913.
1,235,887.
Patented Aug. 7, 1917.
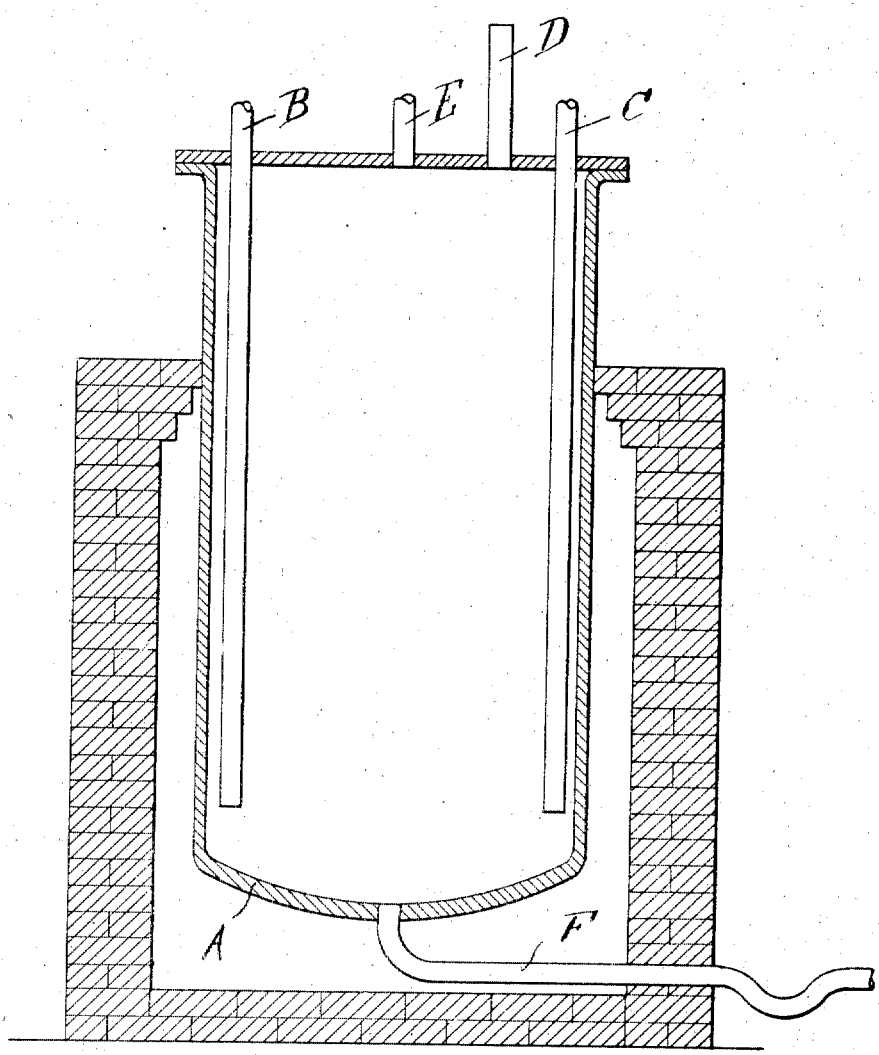

UNITED STATES PATENT OFFICE.

HANS FOERSTERLING, HERBERT PHILIPP, AND RALPH NELSON SARGENT, OF PERTH AMBOY, NEW JERSEY, ASSIGNORS TO THE ROESSLER & HASSLACHER CHEMICAL CO., OF NEW YORK, N. Y., A CORPORATION OF NEW YORK.

PROCESS OF MANUFACTURING CYANOGEN COMPOUNDS.

1,235,887.     Specification of Letters Patent.     Patented Aug. 7, 1917.

Application filed October 29, 1913. Serial No. 798,043.

*To all whom it may concern:*

Be it known that we, HANS FOERSTERLING, a citizen of the Empire of Germany, HERBERT PHILIPP and RALPH NELSON SARGENT, both citizens of the United States, all residing in Perth Amboy, in the county of Middlesex and State of New Jersey, have invented certain new and useful Improvements in Processes of Manufacturing Cyanogen Compounds, of which the following is a specification.

Our invention relates to the manufacture of cyanogen compounds and it particularly refers to their manufacture by synthesis from the respective constituent elements.

In a copending application for U. S. Letters Patent we describe a process for making cyanogen compounds by combining a volatile metal, such as for instance an alkali or alkali earth metal, carbon and nitrogen, wherein most of the cyanogen compound remains absorbed in the carbonaceous material. The present invention refers to a process furnishing technically pure cyanogen compounds and is based on the observation that carbonaceous material, properly divided and disseminated, combines instantaneously and completely with the vapors of a volatile metal and nitrogen gas to a cyanogen compound whereby the reaction, once started, evolves considerable heat and sustains itself so that the operation of the process may be continued without any further addition of external heat.

Owing to the fact that in this process the carbonaceous matter is completely consumed in a reaction, simultaneously delivering heat and rendering same available, we may justly and aptly say that the process forming the subject-matter of this invention actually represents and clearly demonstrates a process of combustion, in which instead of air, the mixture of nitrogen and oxygen, a fluid consisting of the vapor of a metal, as for instance sodium-vapor, and nitrogen gas is supplied; the process in our copending application therefore relates to a process for the partial combustion of carbon under the respective conditions pointed out therein.

As our invention demands that the metal, the cyanogen compound of which is desired, be applied in the form of vapor, it is obvious that our invention relates primarily to the production of both alkali and alkali earth cyanids, as the metals of these groups may be more or less easily vaporized; but the production of cyanids of such other metal, forming cyanids and being susceptible to volatilization, is also claimed as coming within the scope of our invention.

The accompanying drawing, which is a vertical sectional view of a suitable reaction vessel surrounded by the furnace-walls, shows one way by means of which our invention may be practised.

The following example for the production of sodium cyanid may serve for the further elucidation of our invention: A vessel A, of strong construction to satisfactorily stand the wear and tear of the process and not to be affected by the action of alkali metal vapor or other raw materials nor by the products of the reaction, is heated to a temperature in close proximity to the boiling point of the metal applied, as for instance in the case of applying sodium, to about 800° C., and by the pipes B, C and D in the same order they are named below the following substances, viz., sodium vapor, nitrogen gas and finely divided charcoal are then admitted into the reaction vessel in the proper proportion to form sodium cyanid according to the equation: $Na+C+N=NaCN$. It is necessary also to properly disseminate the finely divided charcoal within the reaction vessel in order to preserve its reactive properties. There are various substitutes for finely divided charcoal, for any carbonaceous matter, segregating carbon in a fine modification under the conditions prevailing in the reaction vessel, may serve for the purpose of this process; such substitutes are for instance hydrocarbons, peat-powder, etc.

It is furthermore essential for the success of the process to have an intimate mixture of the sodium vapor and nitrogen gas wherefore both, though not necessarily, enter the reaction vessel in more or less close proximity, for instance the sodium vapor through pipe B, and the nitrogen gas through pipe C.

On introduction the elements are readily brought to the point of ignition by the temperature within the reaction vessel and in the distributing through same such an intimate mixture is created that the reaction takes place instantaneously, at the same time raising the temperature rather rapidly to above 1000° which temperature may be controlled by varying the rate of feeding the raw materials as to speed or quantity of same, or also by controlling the radiation of heat through the reaction vessel or by resorting to both means for this latter purpose. The external heat is shut off as soon as a reasonable increase in temperature indicates start of reaction.

When we state that the process after being started once requires no additional outside heat, it of course must be understood that the materials must be fed at such a rate that the exothermic heat counterbalances the heat of radiation of the apparatus.

Our exothermic process can naturally also be carried out in an apparatus designed to radiate the heat to such an extent that it will require outside heat.

Though stated above that the raw materials are applied in quantities according to the equation cited in connection thereto we may state that we found it advisable to use a slight excess of nitrogen gas to prevent the accumulation of unreacted gases; provision for the exit of such gases is made by pipe E. After the reaction is started once the process may be continued without further supply of any external heat as the process, owing to the heat of reaction, is self-sustaining; and the formed sodium cyanid can be either continuously or intermittently withdrawn by suitable means, as for instance, the drainage pipe F provided at the bottom of A.

In withdrawing the generated alkali cyanid from the reaction vessel provision must be made for dropping same into a vessel or container which is at a temperature lower than the decomposition point of alkali cyanid.

It is obvious that the process described above may be carried out in any suitable apparatus which will readily allow the various operations described to be performed. Many changes may also be made in the mode of operating the process as far as its purely chemical side is concerned, which changes in their character will in no way deviate from the spirit of our invention and we therefore shall not restrict ourselves to the mode of carrying out the process as described further than the scope of the appended claims demands.

Furthermore it is of course understood that the heating from "outside" may be effected with any kind of heat derived from any source whatever which in regard to its origin and character naturally must be fundamentally different from the heat furnished by the energy of the reaction, the method of obtaining said latter kind of heat and its utilization forming one of the main parts of the subject matter of this invention.

We claim:

1. The exothermic process of making cyanogen compounds, consisting in bringing the theoretical quantities of their finely divided constituents into reaction, rendering available the heat generated by said reaction and making the process substantially self-sustaining by means of said heat of reaction.

2. The exothermic process of making cyanogen compounds, consisting in acting with finely divided carbon on nitrogen and the vapors of a metal susceptible to volatilization in theoretical proportions, rendering the heat of reaction available by continuously maintaining the aforesaid theoretical quantities of the constituents at approximately the boiling point of the applied metal, and promoting the combination of further quantities of the same by means of the heat of the reaction.

3. The exothermic process of making cyanogen compounds, consisting in combining in theoretical quantities finely divided carbon with nitrogen and the vapors of a metal susceptible to volatilization at a temperature in close proximity to the boiling point of the applied suitable metal, generating heat by the reaction between the aforesaid elements, discontinuing the supply of outside heat upon a reasonable increase of temperature indicating start of reaction and sustaining the further operation of the process by the available heat of reaction.

4. The exothermic process of making cyanogen compounds, consisting in combining in theoretical quantities finely divided carbon with nitrogen and the vapors of a metal susceptible to volatilization at a temperature in close proximity to the boiling point of the applied metal, generating heat by the reaction between the aforesaid elements, discontinuing the supply of outside heat upon a reasonable increase of temperature indicating start of reaction, sustaining the further operation of the process by the available heat of reaction and regulating the temperature by varying the feed of raw materials as to speed and quantity.

5. The exothermic process of making cyanogen compounds, consisting in combining in theoretical quantities finely divided carbon with nitrogen and the vapors of a metal susceptible to volatilization at a temperature in close proximity to the boiling point of the respective metal and rendering available the heat generated by said reaction, the dissemination of the finely divided carbon to preserve its reactive power.

6. The exothermic process of making cyanogen compounds, consisting in combining theoretical quantities of a carbonaceous matter which will segregate carbon at the prevailing temperature, with nitrogen and the vapors of a volatile metal susceptible to volatilization at a temperature in close proximity to the boiling point of the aforesaid volatile metal.

7. The exothermic process of making alkali metal cyanid, consisting in bringing theoretical quantities of finely divided carbon, nitrogen and of the vapor of the respective alkali metal in reaction and liberating heat thereby.

8. The exothermic process of making alkali metal cyanid, consisting in bringing theoretical quantities of finely divided carbon, nitrogen and the vapor of the respective alkali metal in reaction, rendering available the heat generated by said reaction and making the process self-sustaining by means of said heat of reaction.

9. The exothermic process of making alkali metal cyanid, consisting in combining in theoretical quantities finely divided carbon with nitrogen and the vapors of the respective alkali metal at a temperature in close proximity to the boiling point of the applied alkali metal thereby rendering available the heat liberated by the reaction.

10. The exothermic process of making cyanogen compounds, consisting in combining in theoretical quantities finely divided carbon with nitrogen and the vapors of the respective alkali metal at a temperature in close proximity to the boiling point of the applied alkali metal, generating heat by the reaction between the aforesaid elements and promoting the combination of further quantities of same by means of the heat of reaction.

11. The exothermic process of making alkali metal cyanids, consisting in combining in theoretical quantities finely divided carbon with nitrogen and the vapors of an alkali metal at a temperature in close proximity to the boiling point of the applied metal, generating heat by the reaction between the aforesaid elements, discontinuing the supply of outside heat upon a reasonable increase of temperature indicating start of reaction and sustaining the further operation of the process by the available heat of reaction.

12. The exothermic process of making alkali metal cyanids, consisting in combining in theoretical quantities finely divided carbon with nitrogen and the vapors of the respective alkali metal at a temperature in close proximity to the boiling point of the applied alkali metal, generating heat by the reaction between the aforesaid elements, discontinuing the supply of outside heat upon a reasonable increase of temperature indicating start of reaction, sustaining the further operation of the process by the available heat of reaction and regulating the temperature by varying the feed of raw materials as to speed and quantity.

13. The exothermic process of making alkali metal cyanids consisting in acting at a temperature in close proximity to the boiling point of the applied alkali metal upon theoretical quantities of a carbonaceous matter which will segregate carbon at the prevailing temperature, nitrogen and the aforesaid alkali metal, said alkali metal being in form of vapor.

14. The exothermic process of making sodium cyanid, consisting in bringing theoretical quantities of sodium vapor into reaction with such of nitrogen and finely divided carbon and rendering the heat liberated thereby available.

15. The exothermic process of making sodium cyanid, consisting in bringing theoretical quantities of sodium vapor into reaction with such of nitrogen and finely divided carbon by said reaction and rendering available the heat generated, making the process self-sustaining by means of said heat of reaction.

16. The exothermic process of making sodium cyanid, consisting in combining in theoretical quantities finely divided carbon with nitrogen and sodium vapor at a temperature in close proximity to the boiling point of sodium, generating heat by the reaction between the aforesaid elements and promoting the combination of further quantities of same by means of the heat of reaction.

17. The exothermic process of making sodium cyanid, consisting in combining in theoretical quantities finely divided carbon with nitrogen and sodium vapor at a temperature in close proximity to the boiling point of sodium, generating heat by the reaction between the aforesaid elements, discontinuing the supply of outside heat upon a reasonable increase of temperaure indicating start of reaction and sustaining the further operation of the process by the available heat of reaction.

18. The exothermic process of making sodium cyanid, consisting in combining in theoretical quantities finely divided carbon with nitrogen and sodium vapor at a temperature in close proximity to the boiling point of sodium, generating heat by the reaction between the aforesaid elements, discontinuing the supply of outside heat upon a reasonable increase of temperature indicating start of reaction, sustaining the further operation of the process by the available heat of reaction and regulating the temperature by varying the feed of raw materials as to speed and quantity.

19. The method of generating heat, consisting in combining carbon in a suitable form with nitrogen and a volatile metal, able to form a cyanogen compound, at a temperature in close proximity to the boiling point of said volatile metal, and separating the residue in the form of such cyanogen compounds.

20. The method of generating heat, consisting in combining carbon in a suitable form with nitrogen and the vapor of a metal able to form a cyanogen compound, at a temperature in close proximity to the boiling point of said volatile metal, and separating the residue in the form of such cyanogen compounds.

21. The method of generating heat, consisting in combining carbon in a suitable form with nitrogen and the vapor of an alkali metal at a temperature in close proximity to the boiling point of the respective alkali metal, and separating the residue forming an alkali metal cyanid.

22. The method of generating heat, consisting in combining carbon in a suitable form with nitrogen and sodium vapor at a temperature in close proximity to the boiling point of sodium, and separating the residue forming sodium cyanid.

HANS FOERSTERLING.
HERBERT PHILIPP.
RALPH NELSON SARGENT.

Witnesses:
MARIE NETEL,
OTTO K. ZWINZENBERGER.